United States Patent Office 3,337,594
Patented Aug. 22, 1967

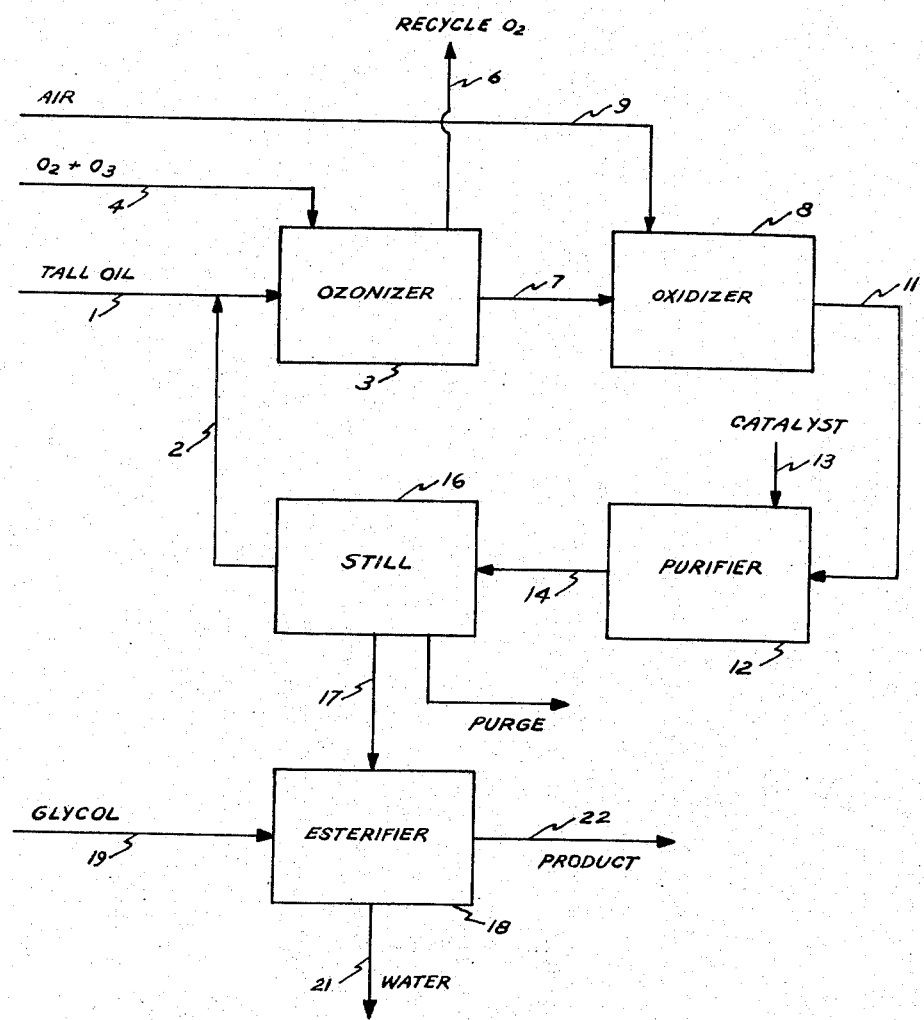

3,337,594
PREPARATION OF POLYMERIC PLASTICIZERS FROM TALL OIL FATTY ACIDS
George L. Braude, North Linthicum, Md., assignor to W. R. Grace & Co., New York, N.Y., a corporation of Connecticut
Filed Sept. 19, 1963, Ser. No. 309,998
3 Claims. (Cl. 260—410.6)

This is a process for the manufacture of polymeric plasticizers. More specifically, this invention relates to methods of manufacture of polymeric plasticizers from tall oil fatty acids.

Large quantities of plasticizers are consumed each year in the formation of plastic compositions, coatings, films, filaments and the like. Polymeric plasticizers are normally produced by the reaction of a dicarboxylic acid, such as azelaic acid and a monocarboxylic acid, such as, pelargonic acid or caproic acid, with a glycol (like propylene glycol). Prior art processes describe the manufacture of azelaic, pelargonic, caproic acids as reaction products of the ozonization and oxidations of tall oil fatty acids. Following the ozonizations and oxidation reactions various schemes have been proposed for separating and purifying the individual mono and dicarboxylic acids. These include extraction, distillation, crystallization or a combination of these different methods. Though satisfactory from a standpoint of purity these prior art processes suffer from the disadvantage of high processing costs.

It is an object of this invention to provide methods of manufacture of polymeric plasticizers without the need for expensive separations or purification of the acid components.

It is another object of this invention to provide a one-step process for the conversion of tall oil fatty acids to polymeric plasticizers.

It is a further object to provide new methods for forming plasticizer type esters in very high yields which are substantially free of discoloration and which possess a high degree of purity.

Still other objects of the invention will become apparent to those skilled in the art from the following detailed description, specific examples and drawing wherein the figure is a flow sheet for the continuous production of polymeric plasticizers modified in accordance with the present invention.

Broadly, I have found that the crude reaction mixture obtained by ozonization and oxidation of tall oil fatty acids can be treated to remove impurities, and then esterified without separation to the mono and dibasic components, to obtain valuable plasticizers.

Referring now to the figure:

Tall oil fatty acids 1 are blended with recycle monobasic acids, stream 2 and fed to an ozonizer 3, where an oxygen stream 4 containing ozone is passed through the tall oil-acid mixture. Excess oxygen is removed through conduit 6 and recycled to the ozonization equipment. The ozonized acid stream 7 is then fed to the oxidizer unit 8 where it is air oxidized; air for the reaction enters through conduit 9. The oxidized mixture stream 11 is then passed into the purification reactor 12, where a condensation catalyst is added via conduit 13. The mixture from the reactor 12, stream 14 is passed through still 16 where it is distilled. One portion of the distillate stream 2, is returned to the front end of the process to be admixed with the incoming tall oil fatty acids 1. The other portion of the distillate stream 17 is fed into the esterification reactor 18. Alcohol for the esterification enters the reactor 18 via conduit 19. Water from the esterification reaction is removed via conduit 21 and the product, a polymeric plasticizer is removed through conduit 22.

In the operation of this invention viscous tall oil fatty acids are diluted with a monobasic acid before entering the ozonizer 3. The preferred diluent acid is a recycled cut from still 16. The diluted tall oil mixture is treated with ozone at a temperature of from about 40–60° C. until the double bonds of the fatty acids have been reacted. The resulting product of ozonation stream 7, is then air oxidized in the oxidizer 8 at a temperature of from about 75–100° C., forming a mixture of mono and dicarboxylic acids, having carbon chain lengths of from about 6–18.

In the purification reactor 12, a condensation catalyst such as silica alumina, aluminum chloride, silica magnesia, silica alumina magnesia, and the like is added to the air oxidized mono and dicarboxylic acids. The catalyst is added at a rate of from about 0.1–10 lbs. per hour, for each 100 lbs. of tall oil charged and the reaction temperature is maintained at from about 100–200° C. for about 15–60 minutes. Desirably the temperature should be kept low and the reaction time long, but the higher temperatures can be tolerated if the reaction time is not of long duration. This processing step condenses the various impurities such as aldehydes, ketones, and color forming materials.

Volatile fractions are stripped from the catalyst and the decomposition residues in the still 16, and the mono and dicarboxylic acids are separated into two cuts. One cut stream 2 consists of lower monobasic acids and is returned to the front end of the process as the diluent for the said tall oil fatty acids; the other cut stream 17 contains monobasic and dibasic acids and is esterified in reactor 18.

The esterification is carried out in the conventional manner through the condensation of the said mono basic and dibasic acids with a glycol such as ethylene glycol, propylene glycol, diethylene glycol, triethylene glycol, 1,3-butylene glycol and the like. The amount of glycol used is that amount necessary for the esterification of the hydroxyl groups of the said acids.

An alternate method of purifying the crude mixture of mono or dicarboxylic acids obtained in the oxidation reactor involves hydrogenation in the presence of a catalyst. In this operation, aldehydes, ketones or other impurities are reduced. The reduction product may be alcohols, which do not interfere with the effective use of the acid mixture in the preparation of plasticizers.

Any conventional hydrogenation process can be used. We prefer to use a palladium or platinum catalyst, or palladium on charcoal or silica gel, or platinum on charcoal or silica gel and hydrogenate at a pressure of from about 200–300 p.s.i.g. and a temperature of from about 100–1000° C. As in other hydrogenation reactions, the temperature, time, hydrogen pressure and catalyst concentration can be varied without departing from the spirit of the invention.

The following examples illustrate various methods within the scope of this invention for producing polymeric plasticizers from tall oil fatty acids. The degree of purification of the plasticizer was determined by color measurement using the Gardner-Hellige comparator. A commercially acceptable range of color measured by this instrument is 5–15.

*Example I*

Polymeric plasticizers were prepared by admixing equal parts of tall oil fatty acids 1, and recycle monobasic acids stream 2, and charging the mixture into the ozonizer 3 at a rate of 200 lbs. per hour. An oxygen stream 4 containing 25 lbs. of ozone per hour was passed through the tall oil fatty acid mixture. The temperature in the ozonizer 3 was maintained at 50° C. by cooling. After ozonization, the ozonide-acid mixture stream 7 was oxidized in the oxidizer 8 at a temperature of 75–100° C. After oxidation the mixture ("oxidate") was fed into the purification reactor 12 where silica alumina catalyst powder was added via conduit 13 at a rate of 2 lbs. per hour. The temperature was raised to 160° C. and maintained for 30 minutes. In this purification step, aldehydes, ketones, and other impurities, as well as color forming materials were condensed. After purification the "oxidate" was distilled in still 16 where the impurities were purged and the mixture separated into two cuts, one containing lower monobasic acids was recycled to the front end of the process to be admixed with the tall oil fatty acids 1, the other cut containing approximately equal preparations of monobasic and dibasic acids was charged into the continuous esterification reactor 18. Propylene glycol at a rate of 29 lbs. per hour was added via conduit 19 to the reactor 18 and the "oxidate" was esterified at 180–200° C. for 0.5 hr., while removing water 21. The resultant polymeric plasticizer was recovered from reactor 18 and the color as measured on the Gardner-Hellige comparator was 6.0, well within the commercially acceptable range.

The following two examples are duplications of Example I except that portions of the "oxidate" were removed from the system after oxidation and were separately purified using hydrogenation or condensation with aluminum chloride.

*Example II*

A sample of "oxidate" from the oxidizer unit 8 was mixed with 0.2% by weight of activated carbon and 0.7% by weight of palladium on charcoal catalyst. The mixture was purged with hydrogen at one atmosphere and 115° C., until all water was removed. The mixture was then held at 115° C. and 275 p.s.i.g. of hydrogen for 5 hours. After hydrogenation the purified "oxidate" was esterified with propylene glycol at 180°–200° C. for 0.5 hr. The color of the ester as measured on the Gardner-Hellige comparator was 10.

Hydrogenation of the oxidate results in the conversion of a large part of the carbonyl compounds present (aldehydes and ketones) to alcohols. The presence of alcohols for the manufacture of plasticizers is not objectionable.

*Example III*

A sample of "oxidate" from the oxidizer unit 8 was vigorously mixed with 0.5% by weight of $AlCl_3$ at 40° C. The mixture was distilled at a total pressure of 0.5 to 1.0 mm. Hg and that portion of the charge coming over between 115–200° C. was esterified with propylene glycol. The color of the ester as measured on the Gardner-Hellige comparator was 10.

It will now be apparent to those skilled in the art that the present invention provides a novel improvement in the process and production of polymeric plasticizers from mono and dibasic acids produced from tall oil by ozonization and oxidation. This acid mixture is treated to remove impurities and then esterified to the plasticizer without separation into the mono and dibasic acid components.

What is claimed is:

1. In a continuous process for the production of polymeric plasticizers from tall oil fatty acids wherein said acids are ozonized, oxidized, purified and esterified with propylene glycol, the improvement which comprises conducting said purification step by condensing said acids at a temperature of from about 100 to 200° centigrade for about 15 to 60 minutes with a condensation agent selected from the group consisting of silica alumina and aluminum chloride, said condensation agent being in an amount of from about 0.1 to 10 pounds per hour for each 100 pounds of said acids.

2. The process according to claim 1 wherein the condensation agent is silica alumina catalyst powder.

3. The process according to claim 1 wherein the condensation agent is aluminum chloride.

References Cited

UNITED STATES PATENTS

| | | | |
|---|---|---|---|
| 2,560,156 | 7/1956 | Cavanaugh et al. | 260—406 X |
| 2,813,113 | 11/1957 | Goebel et al. | 260—406 |
| 2,865,937 | 12/1958 | Maggiolo | 260—406 |
| 3,207,784 | 9/1965 | Barrett et al. | 260—406 X |

ALEX MAZEL, *Primary Examiner.*

HENRY R. JILES, CHARLES B. PARKER,
*Examiners.*

ANTON H. SUTTO, *Assistant Examiner.*